May 3, 1966　　　　　L. K. EDWARDE　　　　　3,249,117
GATE VALVE
Filed June 7, 1962　　　　　　　　　　　　　　6 Sheets-Sheet 1
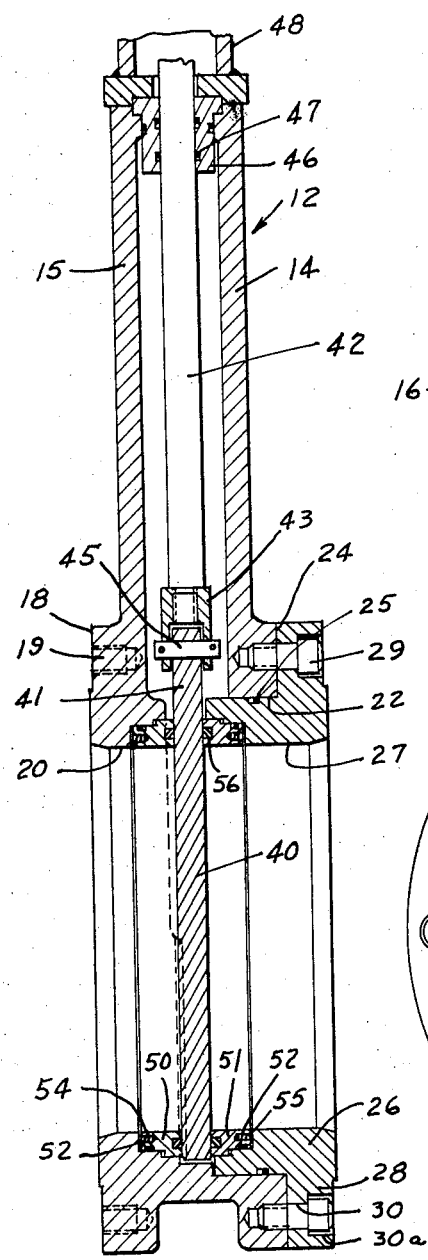
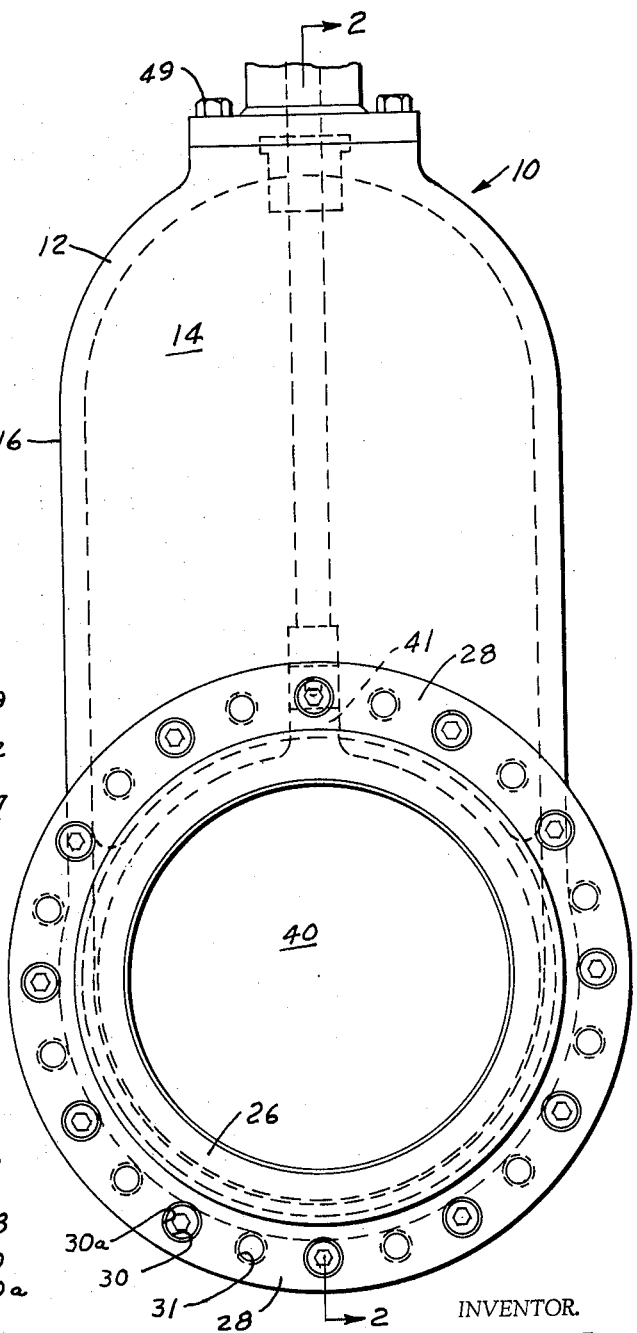
INVENTOR.
LEO K. EDWARDE
BY Edward B Gregg

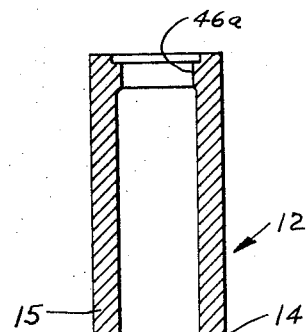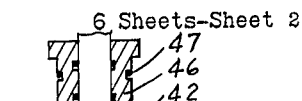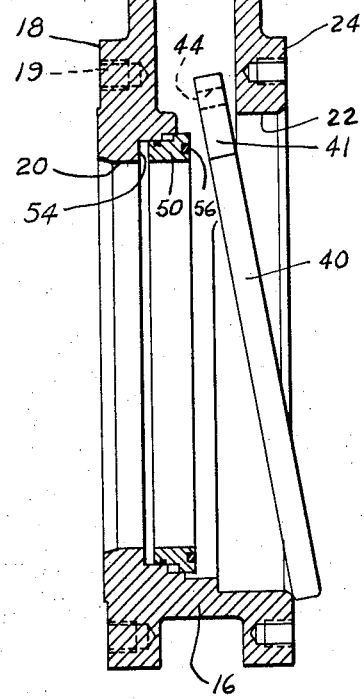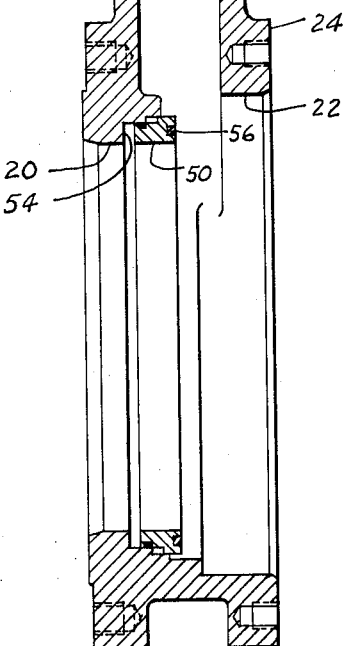

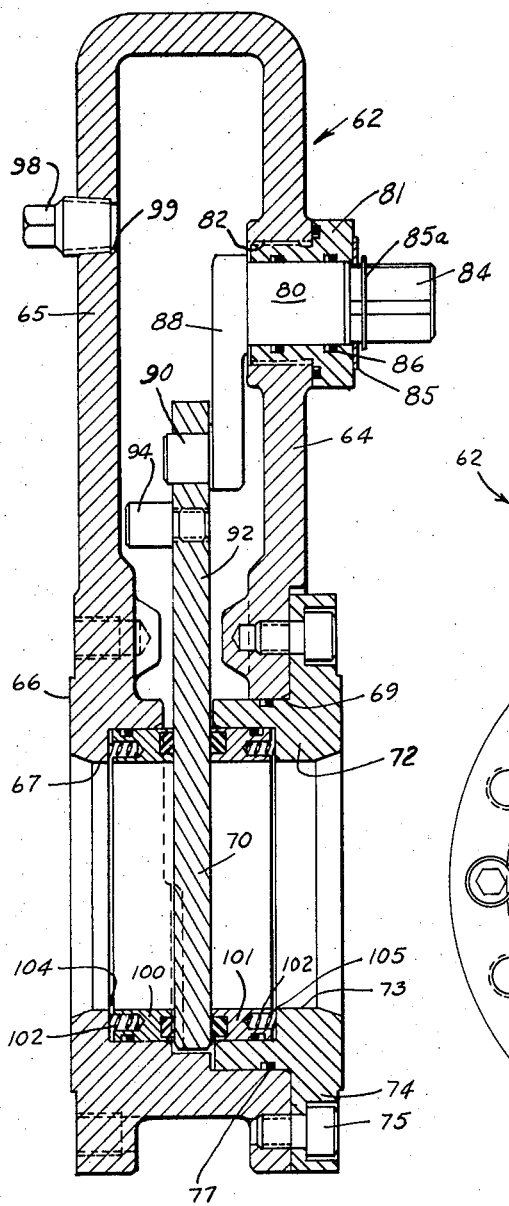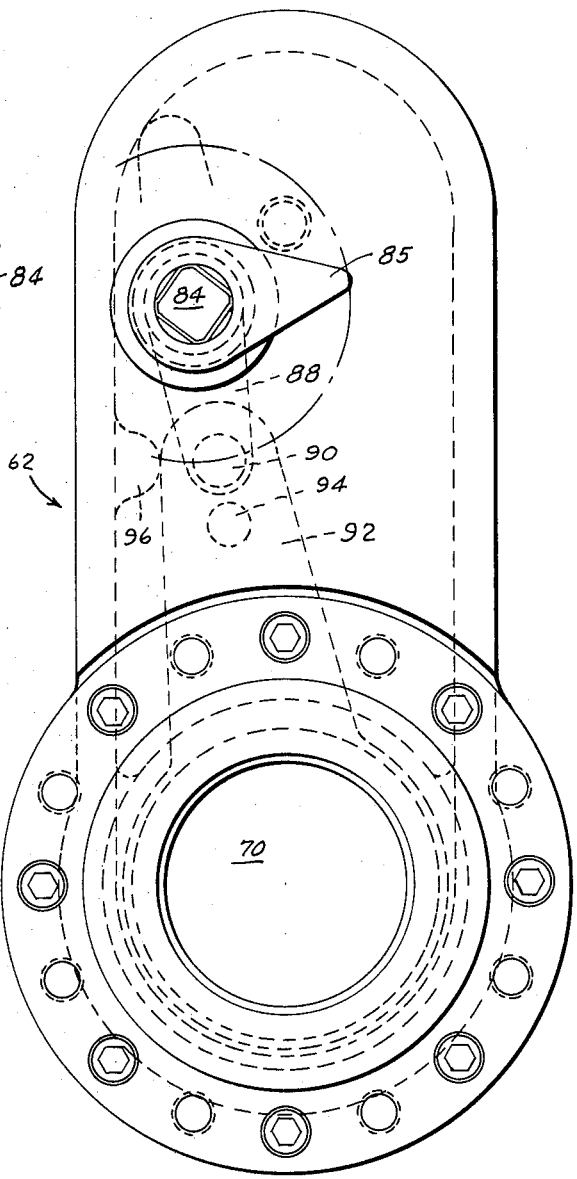
INVENTOR.
LEO K. EDWARDE
BY Edward B. Fregg

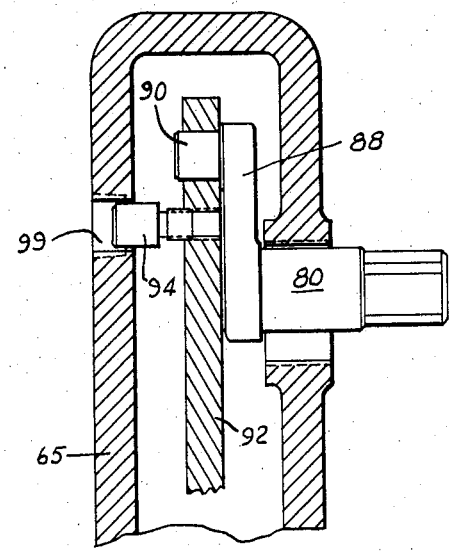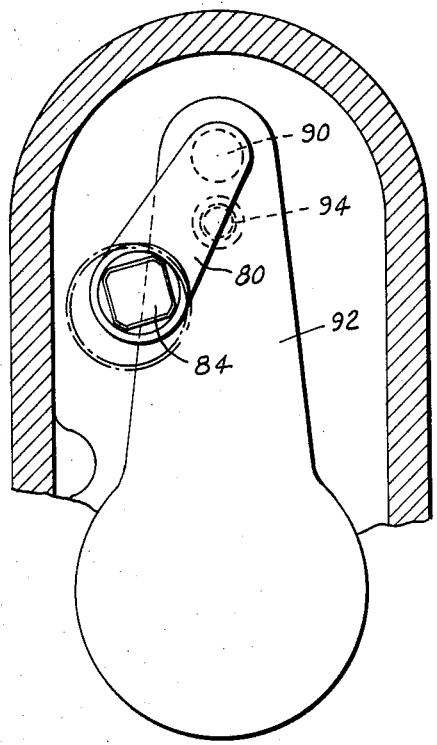

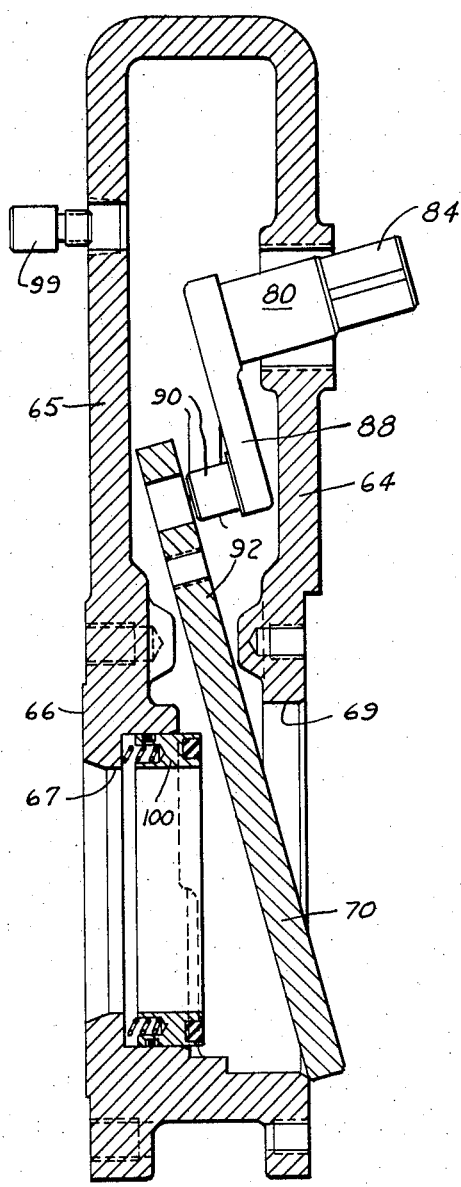
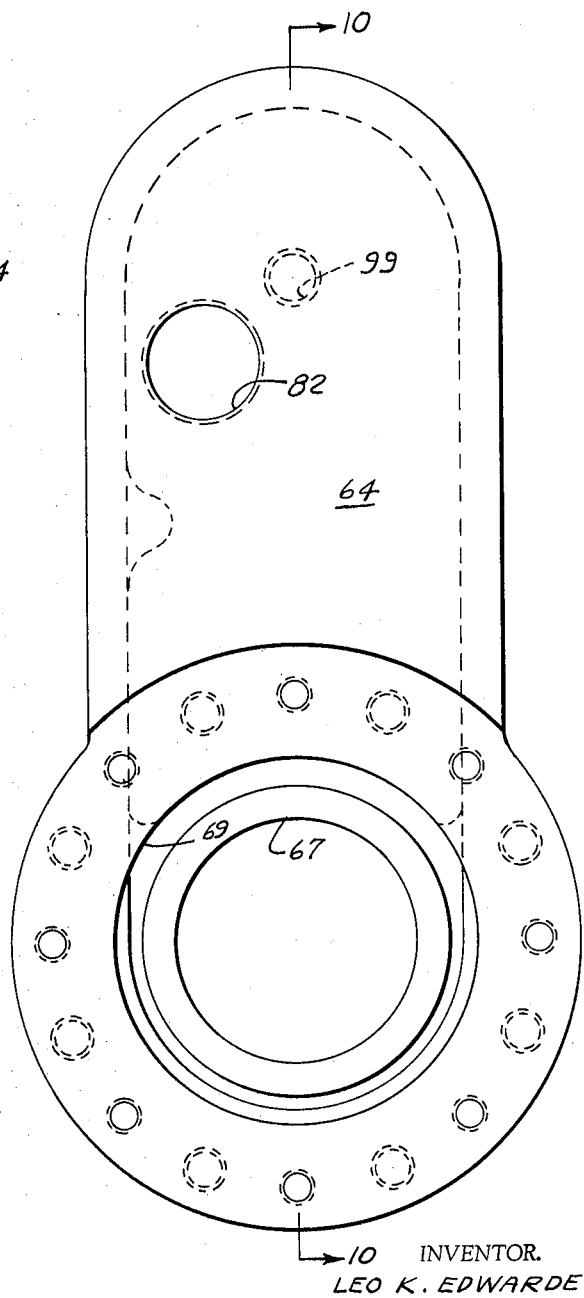

May 3, 1966 L. K. EDWARDE 3,249,117
GATE VALVE

Filed June 7, 1962 6 Sheets-Sheet 6

INVENTOR.
LEO K. EDWARDE
BY Edward B Gregg

United States Patent Office 3,249,117
Patented May 3, 1966

3,249,117
GATE VALVE
Leo K. Edwarde, Piedmont, Calif., assignor to Grove Valve and Regulator Company, Oakland, Calif., a corporation of California
Filed June 7, 1962, Ser. No. 200,827
7 Claims. (Cl. 137—315)

This invention relates to gate valves and the like and, more particularly, to a gate valve structure including means to facilitate the assembly and replacement of the gate valve element.

In the manufacture of gate valves, and particularly in valves of smaller sizes, it would be highly desirable to cast the valve bodies on a mass production basis, rather than to fabricate them by other, more labor-consuming, methods. However, with a complete gate valve body cast as a unit the gate element and its associated actuator, whether it be a stem or a lever control, cannot by present methods be inserted or removed conveniently. Because of this difficulty in assembling the gate, and conditioning it for operation, gate valves with pre-cast valve bodies have not been commercially successful.

It is, therefore, an object of this invention to provide a valve structure that facilitates insertion and assembly of a valve element within a completely-formed valve body.

It is a further object of this invention to provide a valve having a stem-controlled gate valve element which may be installed or replaced within a pre-formed closed valve body.

It is a further object of this invention to provide a lever-operated gate valve element that may be installed or replaced within a pre-formed, closed gate valve body.

It is a further object of this invention to provide a panel in the valve body that may be removed to provide access to the interior for removal and replacement of the valve element, and then be replaced securely while the valve is removed from installation in a pipe line.

This invention is particularly applicable to pre-formed valve bodies of unitary construction, as, for example, valve bodies that are cast. A large opening on one side of the valve body permits the valve gate to be inserted and removed without interference but prior to installation in the line the size of the opening is reduced by a sleeve that carries the valve seat on the inner side and a radial flange for connection in a pipe line on the outer. At the upper end of the valve body there is provided an access opening through which the gate actuating member, e.g., the valve stem, may be attached to or detached from the gate proper, as by manipulation of a simple pin joint. Thus, the gate member is inserted through the large access opening; the gate actuating member is introduced; the gate is moved until the pin joint coupling is in alignment with the smaller access opening and the pin joint is completed. Then, the small access opening is closed with a suitable plug or bearing member and the large access opening is partially closed by the sleeve that carries one of the gate valve seats.

Other objects and advantages of this invention will become apparent from the description following when read in conjunction with the accompanying drawings wherein:

FIG. 1 is a side elevation of a stem-operated gate valve embodying features of this invention;

FIG. 2 is a section view taken along line 2—2 of FIG. 1;

FIGS. 3 and 4 are similar section views of the valve illustrated in FIG. 1, illustrating the method by which the valve member is removed;

FIG. 5 is a partial top view of the valve body showing the valve stem connection;

FIG. 6 is a side elevation of a lever-operated gate valve embodying features of this invention;

FIG. 7 is a section view of the gate valve illustrated in FIG. 6 with the gate element in operating condition;

FIGS. 8 and 9 are partial section views demonstrating the manner in which the lever-actuator may be manipulated for separation of the gate element therefrom;

FIG. 10 is a section view showing manner of removing the gate element;

FIG. 11 is an elevation view of the lever-operated valve body with valve element removed.

Figure 13:
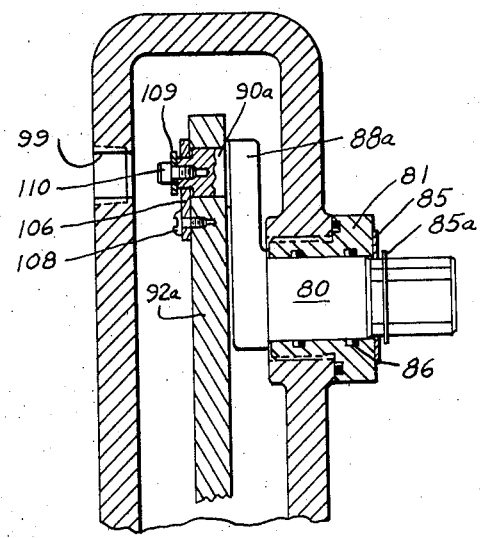
FIGS. 12 and 13 are partial section views of still another form of this invention.

Referring now to the drawings with greater particularity, the valve structure 10 there illustrated is of the gate-valve type and it includes a body 12 formed with end walls or panels 14 and 15 of generally oval shape joined by a peripheral side wall 16. Desirably, the end and side walls 14, 15 and 16 are of unitary construction and are preferably of steel or the like cast as an integral unit. One of the end walls is formed with an integral flange 18 having tapped holes or the like 19 by means of which it may be securely connected to the coupling flange on a pipe (not shown). The panel 15 is formed with a flow passage 20 adapted to form a continuous passage with the interior of a pipe line for flow of fluids to be controlled by the valve element to be described.

The other end wall 14 is also formed with an opening 22 and surrounding radial flange 24 but for a different purpose, as will be understood. Received within the opening 22 is a sleeve 26 having a flow passage opening 27, preferably of the same size as the flow passage 20, and the sleeve carries a radial flange portion 28 which may be secured to the flange 24 of the end wall 14 by means of capscrews or the like 29. Suitable seal means 25 are provided between the sleeve 26 and the side wall 14 to prevent leakage around the sleeve. Referring particularly to FIG. 1, it will be noted that the flange 28 has two series of tapped holes 30 and 31 alternating around the face thereof, the holes 30 being counterbored at 30a in order fully to receive the heads of the capscrews 29 below the surface of the flange 28. Thus, it is apparent that with the sleeve 26 secured against the flange 24 of the end wall 14, the surface of its radial flange 28 is unobstructed and presents a means by which the flange 28 may be coupled directly to the flange of a connecting pipe line (not shown) by engagement of screws or the like to the alternate tap openings 31. It is also apparent that the valve body with the sleeve 26 in place is a complete valve unit as it is inserted in, and removed from, the line.

The valve illustrated in FIGS. 1 to 5 is a gate valve of the stem-operated type and includes a valve element 40 which is of generally circular configuration, being of a diameter larger than the sleeve flow passageway 27, but smaller than the opening 22 in which the sleeve is seated. The gate 40 carries a male coupling element 41 projecting upwardly therefrom and the lower end of the valve stem 42 is threaded into a complementary coupling element 43 which is received over the male extension 41 so that openings therein 44 are aligned to receive a coupling pin 45. At the upper end of the valve body, the stem slides through a packing or seal block 46 having internal and external seals thereon 47 which maintain a seal between the valve stem and the valve body 12. The seal block 46 is held in place sealing the opening 46a in the valve body by means of a yoke 48 through which the stem slides and which is secured in place onto the valve body by means of capscrews 49.

In the interior of the valve, the seal around the gate 40 is maintained by engagement of seat rings 50 and 51 which are pressed against opposite sides of the gate 40 by any suitable means such as the coil spring 52 arranged around the circumference of the seat rings 50 and 51. One of the seat rings 50 is positioned within the shoulder 54 provided around the opening 20 in the side wall 15, while the other seat ring 51 is positioned against a similar shoulder 55 provided in the sleeve 26. Each of the seat rings carries seals 56 that are preferably bonded within an appropriate recess provided in the working face of the seat rings 50 and 51.

It is believed that assembly of the valve will be apparent from the foregoing description but, in any event, it may be summarized by considering FIGS. 1 to 4 in reverse order. Referring first to FIG. 4 there is shown the valve body 12 preferably formed of cast steel with tapped holes around the circumference of flanges 18 and 24. In assembling the valve the inner seat ring 50 is first placed against shoulder 54 to be biased outward by springs 52 associated therewith. Then the gate member 40 is inserted through the wide access opening 22 which is of a diameter sufficiently larger than the gate to permit its entry without interference. The gate is moved through the opening 22 at a slight angle as shown, with the coupling extension 41 inserted first and then moved up into the space within the valve body 12.

Then, the valve stem 42 is inserted through the seal block 46 and the coupling element 43 then threaded thereon (FIG. 3). After the valve stem is thus prepared, the gate member 40 is lifted by the operator to the top of the valve body so that the coupling extension 41 extends through the opening 46a in which the seal block 46 normally seats, as shown in FIGS. 3 and 5. With the gate member 40 so elevated the coupling elements 42 and 43 are connected by placing the gate extension 41 within the coupling element 43 and inserting the coupling pin 45. After the pin is placed, the whole assembly may be lowered into the valve body 12, the assembler merely pushing the seat ring 50 out of the path of the descending gate 40 as the gate and stem are lowered. Once the gate is lowered past the top of the seat ring 50 the springs 52 urge the seat ring snugly against the face of the gate. Then, the seal block 46 is placed within the opening 46a to be seated therein and restrict further lateral play of the gate and stem. This part of the assembly is completed by securing the yoke 48 in place by capscrews 49, holding the seal block 46 seated.

The assembly of the valve is completed by placing the other seat ring 51 within the sleeve 26 against the shoulder 55 thereof, and the sleeve 26 with seat ring in place inserted as a unit into the opening 22 in the panel 14 of the gate valve body 12. With this member in place, the capscrews 29 are inserted and tightened to complete the assembly. It should be quite apparent that this procedure is reversed when it is desired to dismantle the valve as, for example, to replace any part of the gate and stem assembly or the seals associated therewith.

In FIGS. 6 to 11 there is shown a lever-operated gate valve also embodying features of this invention. There, the valve body 62 includes end walls or panels 64 and 65 with the end wall 65 including a coupling flange 66 and a flow passage 67 therethrough. The other end panel 64 has a larger opening 69 of a diameter large enough to receive the gate 70, as will hereinafter be described. Within the opening 69 is seated a sleeve 72 having a flow passage 73 therethrough and carrying a radial flange 74 which may be secured to the valve body end wall 64 by means of capscrews 75. An O-ring seal or the like 77 is provided between the sleeve and the end wall 64 of the valve body 62.

The operating means for the gate include a rotatable shaft 80 which is journaled within a bearing member 81 threadedly received within an opening 82 in the end wall 64 of the valve body 62. The outer end 84 of the shaft is squared or otherwise formed to receive a lever or wrench (not shown) by means of which the shaft is rotated and a pointer 85 is provided to indicate the position of the valve gate 70. A snap ring 85a holds the assembly in place and O-rings 86 are provided to prevent leakage between the shaft and the bearing and between the bearing and the valve body panel 64. A crank 88 is secured to the inner end of the shaft 80 and carries a crank pin 90 that is pivotally connected to the free end of the arm 92 which extends from the gate 70. As shown in FIG. 6, the axis of the shaft 80 is pivotally offset to one side of the center line of the valve body 62 in order to permit the crank 88 to swing through substantially a full 180° arc without interference from the valve body. A guide pin 94 threadedly received in the arm 92 helps to maintain the arm 92 centered within the body and, by keeping the gate 70 vertically disposed maintains engagement of the crank pin 90. A stop member 96 on the side wall of the body 62 limits movement of the arm 92 to stop at the closed position. A plug 98 is threaded into an opening 99 in the valve body panel 65 for a purpose to be explained. The seals against which the valve operates are provided by a pair of seat rings 100 and 101 which are biased by springs 102 away from shoulders 104 and 105 on the valve end wall 65 and the sleeve 72 respectively.

In operation of the valve, a wrench is applied to the square end 84 of the shaft 80 and rotated to swing the crank 88 from the position shown in FIGS. 6 and 7 to an elevated position wherein the arm 92 and gate member 70 are raised to clear the flow passage 67 and 73 for fluid flow.

In order to dismantle the valve, the snap ring 85a and pointer 85 are first removed and the bearing member 81 is threaded out of the valve body over the shaft 80. As shown in FIGS. 8 and 9 the shaft 80 now has a considerable amount of play, with the result that the crank pin 90 and centering pin 94 may now be moved to a position wherein the centering pin is disposed opposite the access opening 99 from which the plug 98 has been removed. Of course, placement of the crank arm in this disposition can more easily be accomplished after removal of the sleeve 72. Then, a screwdriver or the like is inserted into the opening 99 and the centering pin 94 threaded out of the gate actuating arm 92 (FIGS. 8 and 9). Thus, with the pin 94 and sleeve 72 both removed, the gate is now permitted a considerable amount of lateral play and, therefore, may be placed in the position shown in FIG. 10 wherein it slides easily from the crank pin 90 permitting it to be removed from the large opening 69 in which the sleeve 72 is normally seated.

Figure 12:
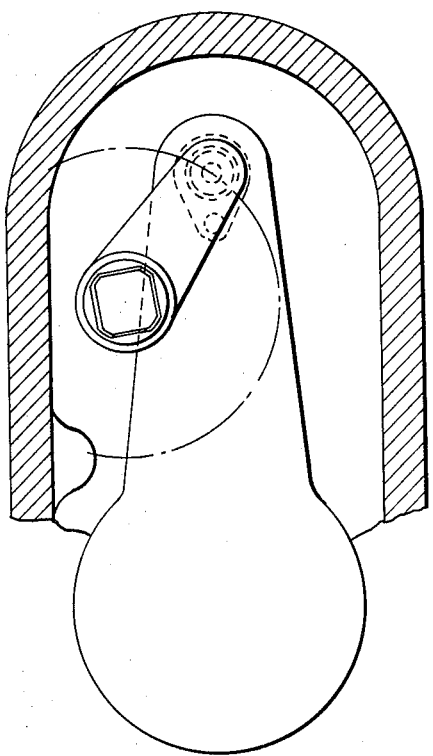

In the embodiment of FIGS. 12 and 13 the arm 92a is secured onto the crank pin 90a by means of a retaining plate 106 secured to the arm 92a by means of a screw 108. The plate 106 provides a bearing surface for a washer 109 or the like held by a screw 110 threaded into the crank pin 90a. Alternatively, the retaining plate 106 could be replaced by an internal flange on the arm 92a extending into the opening in which the crank pin 90a is received. In this embodiment, when the crank is rotated to the position shown in FIG. 13 and the bearing member 81 is removed, the crank may be moved across the valve body 62 until the screw 110 extends into the access opening 99. Then, a screwdriver or the like is inserted through the opening 99 and the screw 110 and washer 109 are removed. The valve is now conditioned so that, with the sleeve 72 (FIG. 7) removed, the gate 70 with arm 92a may be removed.

This invention has been described and illustrated in connection with preferred embodiments of the invention but it is to be understood that modifications and changes therein may be made by those skilled in the art without departing from the spirit and scope of this invention, which is defined by the claims appended hereto.

What is claimed as the invention is:
1. A valve structure comprising:
a valve body having opposite end walls, a gate disposed generally parallel to and intermediate said end walls, a valve actuator having portions thereof moveable intermediate said end walls, complementary coupling means on said gate and said actuator portions, one of said end walls having a main access opening therethrough of a diameter larger than the cross-section of said gate, the other of said end walls having an opening therethrough for the flow of fluid, a circular sleeve adapted to be received within said main access opening in said one end wall, the internal diameter of said sleeve being smaller than the width of the gate, a radial flange on said sleeve, means engaging completely around said flange securing said flange to said one end wall while leaving the outer surface of said flange free of axial protrusions that would prevent a flange coupling with a pipe section, and means on said flange for attachment of the outer surface to a mating flange of a pipe section, both of said flanges having mating engageable annular surfaces of the same diameter.

2. The valve structure defined in claim 1 wherein:

said valve body includes a separate access opening radially displaced from said main access opening through which said complementary coupling means can be connected and disconnected.

3. The valve structure defined in claim 2 wherein said valve actuator comprises:

a shaft rotatable in said valve body and a crank connected thereto, said shaft being received in a bearing removably secured in one of said end walls, and a guide pin removably secured to said gate extending toward one of said end walls, said separate access opening being in said one end wall along the path of movement of said guide pin so that said guide pin may be removed therethrough.

4. A valve structure comprising:

a valve body having opposite end walls, a gate adapted to be disposed generally parallel to and intermediate said end walls, a shaft, a bearing removably secured in one of said end walls rotatably receiving said shaft, a crank connected to said shaft, means including a gate actuating arm coupling said crank to said gate, a guide pin removably secured to the gate actuating arms and extending therefrom toward an end wall, and an access opening in an end wall through which said guide pin may be connected and disconnected from said actuating arm.

5. The valve structure defined by claim 1 wherein the means securing said flange to said one end wall comprises:

means forming a first series of openings around said flange, and screws extending through said openings and threadedly secured to said one end wall, and means forming an enlarged counter-recess coaxial with each of said first series of openings completely receiving the head of the screw engaged in said each opening.

6. The valve structure defined by claim 5 wherein the pipe section attachment means comprises:

means forming a second series of openings around said flange, internal screw threads in each of said second series of holes to accommodate screws extending through a complementary pipe flange.

7. The valve structure defined by claim 1 including:

an annular seal ring axially movable on the inner side of said sleeve, and resilient means biasing said seal ring into sealing engagement with said valve closure member.

References Cited by the Examiner

UNITED STATES PATENTS

| 2,636,713 | 4/1953 | Hamer | 137—315 |
| 2,786,644 | 3/1957 | Koppl | 251—187 |
| 2,869,574 | 1/1959 | Volpin | 251—329 X |
| 2,893,684 | 7/1959 | Williams et al. | 251—328 |
| 2,952,437 | 9/1960 | Knox | 251—302 X |
| 2,962,039 | 11/1960 | Shand et al. | 251—174 X |
| 3,047,006 | 7/1962 | Transeau | 251—301 X |

FOREIGN PATENTS 700,853  12/1953  Great Britain.

M. CARY NELSON, *Primary Examiner.*

MARTIN P. SCHWADRON, *Examiner.*